United States Patent [19]

Kaiser et al.

[11] 4,394,026

[45] Jul. 19, 1983

[54] PANEL EDGE GASKET WITH COMPRESSIBLE SEALING PORTION

[76] Inventors: Kenneth L. Kaiser; William C. Shirley, both of P.O. Box 248, Second & Elm, Hudson, Wis. 54016

[21] Appl. No.: 299,403

[22] Filed: Sep. 4, 1981

[51] Int. Cl.[3] .......................... F16J 15/10; E06B 7/23

[52] U.S. Cl. .................................. 277/231; 277/184; 277/226; 52/309.11; 52/403; 52/595; 52/802

[58] Field of Search ............... 277/184, 205, 231, 232, 277/226; 52/403, 309.11, 394, 716–718, 595, 802, 809; 296/93

[56] References Cited

U.S. PATENT DOCUMENTS

| | | | |
|---|---|---|---|
| 2,280,183 | 4/1942 | Bennett | 277/226 |
| 3,177,534 | 4/1965 | Millhouse et al. | 296/93 |
| 3,760,548 | 9/1973 | Sauer et al. | 52/404 |
| 3,797,190 | 3/1974 | Widdowson | 52/595 |

FOREIGN PATENT DOCUMENTS

| | | | |
|---|---|---|---|
| 2820620 | 11/1979 | Fed. Rep. of Germany | 296/93 |
| 1354946 | 2/1964 | France | 52/809 |
| 2307450 | 11/1976 | France | 277/205 |
| 2308748 | 11/1976 | France | 52/309.11 |
| 765123 | 1/1957 | United Kingdom | 296/93 |

*Primary Examiner*—Robert S. Ward, Jr.
*Attorney, Agent, or Firm*—Mark W. Gehan

[57] ABSTRACT

A panel edge gasket is disclosed comprising a compressible sealing portion, attachment means for attaching the sealing portion to a panel edge, and a flexible wing carried by the attachment means.

7 Claims, 2 Drawing Figures

PANEL EDGE GASKET WITH COMPRESSIBLE SEALING PORTION

FIELD OF THE INVENTION

This invention relates to gaskets. More particularly this invention relates to gaskets for foamed-in-place panels.

BACKGROUND OF THE INVENTION

In the manufacture of foamed-in-place panels (used, for example, as wall panels in walk-in coolers) it has been difficult to attach conventional gaskets to the edges of such panels. This is a major disadvantage as compared to fiberglass panels having a wood frame to which a gasket may be easily fastened by means of nails, screws or staples.

The foamed-in-place panels comprise thin metal skins between which conventional foam-forming ingredients are injected in such a manner that the space between the metal skins becomes filled with foam insulation. Consequently, there is no frame to which a suitable gasket may be attached. Although others have attached gaskets using adhesive or double coated adhesive tape, this has not been totally satisfactory.

SUMMARY OF THE INVENTION

The present invention provides a new type of gasket which mechanically connects to the edge of a foamed-in-place panel without the need for conventional fasteners such as nails, screws or staples. The novel gasket comprises:

(a) a compressible sealing portion, (b) attachment means for attaching said sealing portion to a panel edge, and (c) a flexible wing carried by said attachment means.

The gasket of the invention is preferably an elongated integral member formed of flexible plastic such as polyvinylchloride. The gasket is readily attachable to the edge of foamed-in-place panels having metal skins.

BRIEF DESCRIPTION OF THE DRAWINGS

The invention is described in more detail hereinafter by reference to the accompanying drawings wherein like reference characters refer to the same parts throughout the several views and in which.

DETAILED DESCRIPTION OF THE INVENTION

Figure 1:
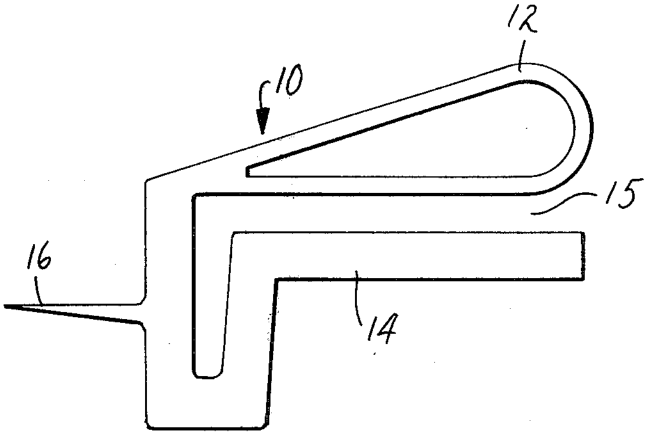
FIG. 1 is an end view of the novel gasket.

In the drawings there is shown panel edge gasket 10 having a compressible or conformable sealing portion 12, attachment means 14, and flexible wing 16 carried by attachment means 14. In the embodiment shown in the drawings sealing portion 12 comprises a flexible plastic envelope which will deform in response to pressure and will thereby conform to the surface, for example, of adjoining panels or other desired surface so as to form a positive seal. The sealing gaskets of this invention are also very useful in conjunction with the type of floor sealing gasket described in our copending application, Ser. No. 06/305,457, filed Sept. 25, 1981 concurrently herewith, incorporated herein by reference.

Preferably the gasket of this invention is integral, and preferably it is made of conventional flexible polyvinylchloride or other suitable plastic which is conformable at low temperatures.

The attachment portion 14 of gasket 10 preferably is L-shaped, as shown in the drawings, with an interior channel 15 extending therethrough. The presence of interior channel 15 enables gasket 10 to readily engage or connect to substrates having a 90° bend therein, as shown in FIG. 2, for example.

The gasket of the invention is preferably made in the form of an elongated strip which can then be cut into any desired length. The gasket is readily and easily formed by extrusion using techniques well known in the art.

Figure 2:
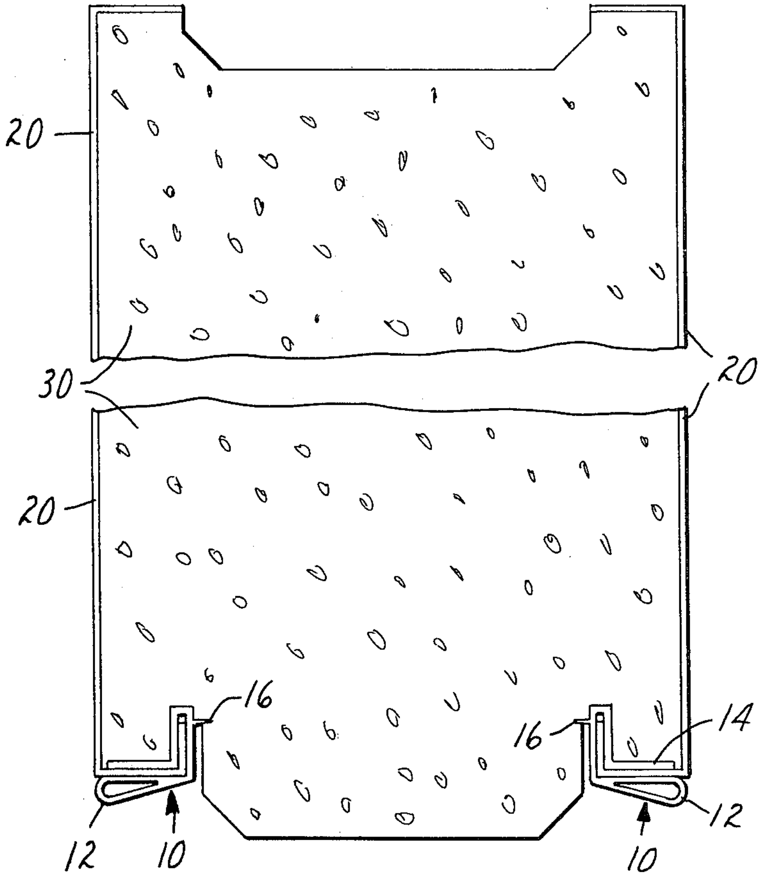
FIG. 2 is an edge view of a foamed-in-place panel whose edges have a novel gasket attached thereto.

In the construction of foamed-in-place panels, the gasket 10 is slipped over the edge of a metal skin 20 which has been bent at an approximate 90° angle (or two 90° angles as shown in FIG. 2). Two such metal skins 20 are then aligned in parallel, spaced-apart position. Conventional foam-forming ingredients are then injected into the space between the metal skins in order to form the foam insulation in situ. A conventional perimeter tool is placed at the edge of the metal skins in order to contain the foam. The flexible wing 16 of gasket 10 forms a seal between the perimeter tool and the foam insulation 30 during the foam-forming process. The flexible wing thus precludes seepage of foam, thereby simplifying clean-up procedures.

What is claimed is:

1. An edge gasket for a foamed-in-place panel comprising (a) a compressible sealing portion, (b) attachment means for attaching said sealing portion to a panel edge, wherein said attachment means is L-shaped with an interior channel which is adapted to engage a substrate having two 90° bends therein, and (c) a flexible wing carried by said attachment means.

2. A gasket in accordance with claim 1, wherein said compressible sealing portion comprises a flexible plastic envelope.

3. A gasket in accordance with claim 1, wherein said attachment means is integral with said sealing portion.

4. A gasket in accordance with claim 1, wherein said attachment means comprises flexible plastic.

5. A gasket in accordance with claim 1 comprising an elongated strip.

6. A gasket in accordance with claim 3, wherein said flexible wing is integral with said attachment means.

7. A panel comprising two spaced-apart parallel metal skins and foamed insulation therebetween, wherein one edge of each of said metal skins includes a portion which is bent inwardly at an approximately 90° angle and then bent inwardly again at approximately 90° so as to be parallel with, but spaced apart from, the remainder of said metal skin, and wherein a panel edge gasket of claim 1 is attached to each said edge of said metal skins.

* * * * *